(12) United States Patent
Kusuyama et al.

(10) Patent No.: US 6,781,131 B2
(45) Date of Patent: Aug. 24, 2004

(54) SCINTILLATOR PANEL, RADIATION DETECTOR, AND METHOD OF MAKING SCINTILLATOR PANEL

(75) Inventors: Yutaka Kusuyama, Hamamatsu (JP); Katsutoshi Nonaka, Hamamatsu (JP)

(73) Assignee: Hamamatsu Photonics K.K., Shizuoka (JP)

(*) Notice: Subject to any disclaimer, the term of this patent is extended or adjusted under 35 U.S.C. 154(b) by 378 days.

(21) Appl. No.: 09/879,062

(22) Filed: Jun. 13, 2001

(65) Prior Publication Data

US 2002/0005489 A1 Jan. 17, 2002

Related U.S. Application Data

(63) Continuation-in-part of application No. PCT/JP98/05645, filed on Dec. 14, 1998.

(51) Int. Cl.[7] .................................................. G01T 1/20
(52) U.S. Cl. ...................................................... 250/368
(58) Field of Search ............................. 250/368, 370.11

(56) References Cited

U.S. PATENT DOCUMENTS

| | | | | |
|---|---|---|---|---|
| 4,267,453 A | * | 5/1981 | Kieboom et al. ............ 250/368 |
| 5,117,114 A | * | 5/1992 | Street et al. ............ 250/370.11 |
| 5,179,284 A | * | 1/1993 | Kingsley et al. ............ 250/368 |
| 5,227,635 A | | 7/1993 | Iwanczyk ............ 250/370.12 |
| 5,563,414 A | | 10/1996 | Sklebitz ............ 250/368 |
| 5,572,034 A | * | 11/1996 | Karellas ............ 250/368 |
| 5,594,253 A | * | 1/1997 | Bueno et al. ............ 250/486.1 |
| 5,693,948 A | | 12/1997 | Sayed et al. ............ 250/370.09 |
| 5,773,832 A | | 6/1998 | Sayed et al. ............ 250/370.09 |
| 6,278,118 B1 | * | 8/2001 | Homme et al. ............ 250/370.11 |
| 2002/0038851 A1 | * | 4/2002 | Kajiwara et al. ............ 250/368 |

FOREIGN PATENT DOCUMENTS

| | | |
|---|---|---|
| JP | 58-210582 | 12/1983 |
| JP | 60-6889 | 1/1985 |
| JP | 61-185844 | 8/1986 |
| JP | 63-215987 | 9/1988 |
| JP | 4-80507 | 7/1992 |
| JP | 5-11060 | 1/1993 |
| JP | 6-277213 | 10/1994 |
| JP | 7-211877 | 8/1995 |
| JP | 7-270537 | 10/1995 |
| JP | 8-215190 | 8/1996 |
| JP | 9-197051 | 7/1997 |
| WO | WO 96/41212 | 12/1996 |

OTHER PUBLICATIONS

A New, General Synthetic Method for the Preparation of Linear Poly–p–xylylenes; William F. Gorham, Journal of Polymer Science: Part A–1, vol. 4, 3027–3039 (1966).

* cited by examiner

*Primary Examiner*—Constantine Hannaher
*Assistant Examiner*—Shun Lee
(74) *Attorney, Agent, or Firm*—Morgan, Lewis & Bockius LLP (57) ABSTRACT

A radiation detector 10 is provided with three optical members 12, 14, 16 arranged so that their entrance end faces 12a, 14a, 16a are placed on a substantially identical plane; a scintillator 18 provided on the entrance end faces 12a, 14a, 16a of the optical members 12, 14, 16; a plurality of CCDs 20 for picking up optical images outputted from exit end faces 12b, 14b, 16b of the optical members 12, 14, 16; and a plurality of lightguide optical members 22 for guiding the optical images outputted from the exit end faces 12b, 14b, 16b of the optical members 12, 14, 16, to the CCDs 20. The optical members 12, 14, 16 are bonded and fixed to each other with an adhesive 24 having the light-absorbing property and spacings between them are set in the range of 10 to 15 μm. A protective film 26 is provided on the scintillator 18.

32 Claims, 6 Drawing Sheets

Fig. 5

SCINTILLATOR PANEL, RADIATION DETECTOR, AND METHOD OF MAKING SCINTILLATOR PANEL

RELATED APPLICATION

The present application is a continuation-in-part application of PCT application No. PCT/JP98/05645 filed on Dec. 14, 1998, designating U.S.A. and now pending.

BACKGROUND OF THE INVENTION

1. Field of the Invention

The present invention relates to a scintillator panel having a photoreceptive region of a large area, a radiation detector using it and a method of making a scintillator panel.

2. Related Background Art

In the medical, industrial, and other fields, there are increasing needs for radiation detectors capable of quickly and accurately detecting and picking up radiation images. For meeting such needs, there are known radiation detectors, for example, provided with a scintillator for converting a radiation image into an optical image, an image pickup device for picking up such an optical image, and a lightguide optical member for guiding the optical image from the scintillator to the image pickup device.

Often used as the above lightguide optical member is an optical member in which optical fibers are arranged in parallel to each other and integrally formed in the density of several million fibers/cm$^2$. It is because the optical member of this type is capable of transmitting an optical image entering its entrance end face, to its exit end face in a high resolution state and emitting the image from the exit end face.

Furthermore, for example, the radiation detectors disclosed in Japanese Patent Application Laid-Open No. H07-211877 are known as radiation detectors with a large photoreceptive surface capable of detecting and picking up the radiation image across a relatively wide range. Such radiation detectors are constructed of an array of radiation detecting units in each of which a scintillator is placed on the entrance end face of the optical member having the entrance end face and the exit end face perpendicular to each other while an image pickup device is placed on the exit end face.

The above radiation detectors, however, had the following problem. Namely, it was not easy to increase the area of the photoreceptive surface of the radiation detector, because the radiation detecting units including the optical members of a special shape (triangular prism shape) had to be arrayed so that their photoreceptive surfaces were aligned on an identical plane. There was also a limit to the increase of the area of the photoreceptive surface, e.g., because of restraints on arrangement of the image pickup devices. Therefore, it was not feasible to achieve the increase of the area enough to satisfy the needs coming from applications in the medical, industrial, and other fields.

SUMMARY OF THE INVENTION

The present invention has been accomplished in view of the above problem and an object of the invention is to provide a scintillator panel and a radiation detector capable of readily and adequately increasing the photoreceptive surface, and a method of making such scintillator panel.

In order to accomplish the above object, a scintillator panel of the present invention comprises a plurality of optical members of a flat plate shape, each optical member having a plurality of optical fibers arranged in parallel to each other and integrally formed and each optical member having an entrance end face and an exit end face substantially parallel to each other, wherein the optical members are arranged so that the entrance end faces thereof are placed on a substantially identical plane, wherein mutually adjoining side faces of the respective optical members are bonded to each other with an adhesive, and wherein a scintillator to emit light upon incidence of a radiation is deposited on the entrance end faces integrated by bonding the side faces. A radiation detector of the present invention comprises the above scintillator panel, and an image pickup device for picking up an optical image outputted from the exit end faces of the optical members.

The photoreceptive surface of the radiation detector can be increased readily and adequately by arranging the plurality of optical members so that the entrance end faces thereof are placed on the substantially identical plane, bonding the mutually adjoining side faces of the optical members with the adhesive, and growing the scintillator on the entrance end faces integrated.

DESCRIPTION OF THE PREFERRED EMBODIMENTS

A radiation detector according to an embodiment of the present invention will be described hereinafter on the basis of the drawings. It is noted that the dimensions and shapes in the drawings do not always reflect the actual dimensions and shapes and there are some exaggerated portions for easier understanding.

Figure 1:
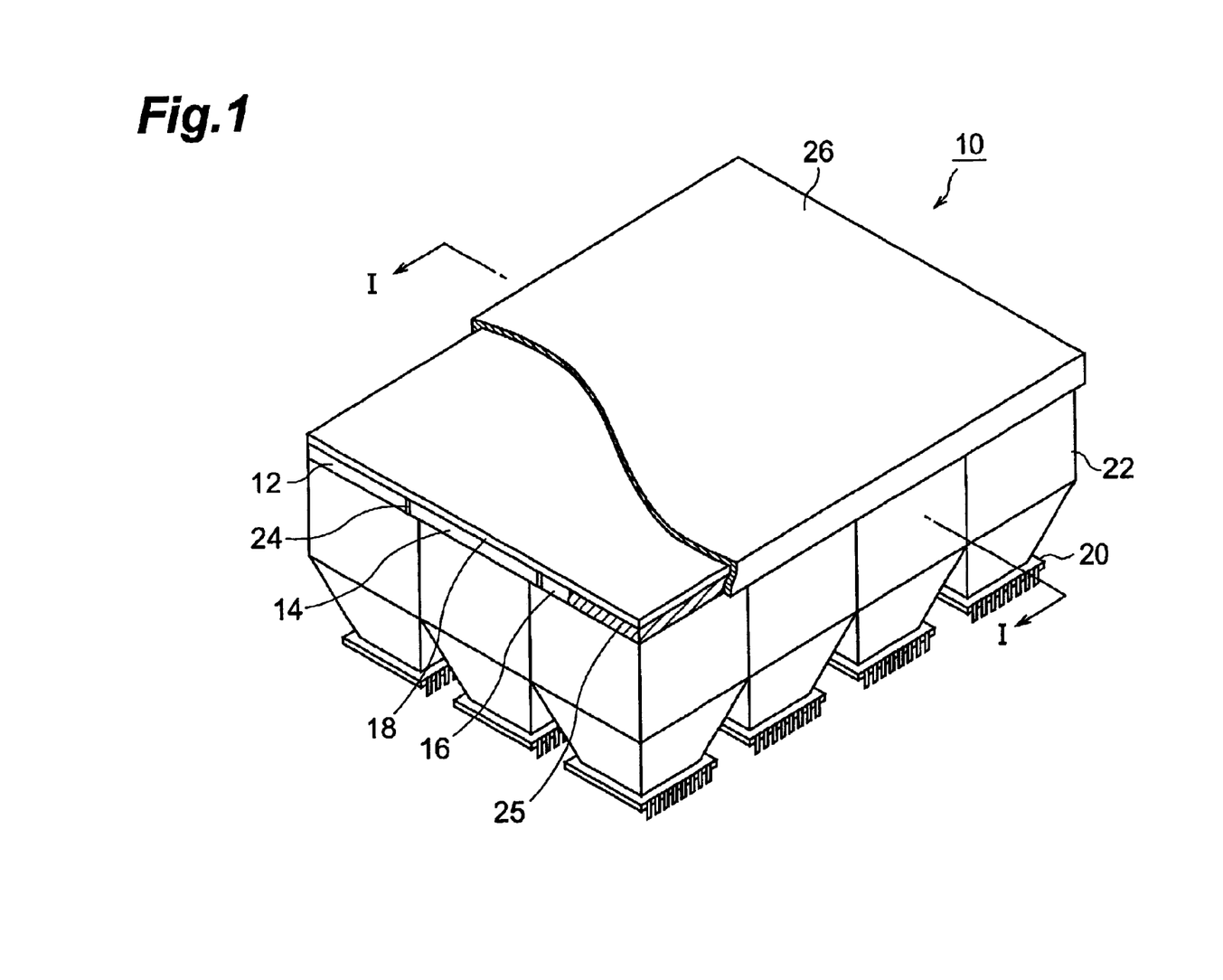
FIG. 1 is a perspective view of a radiation detector according to an embodiment of the present invention.
Figure 2:
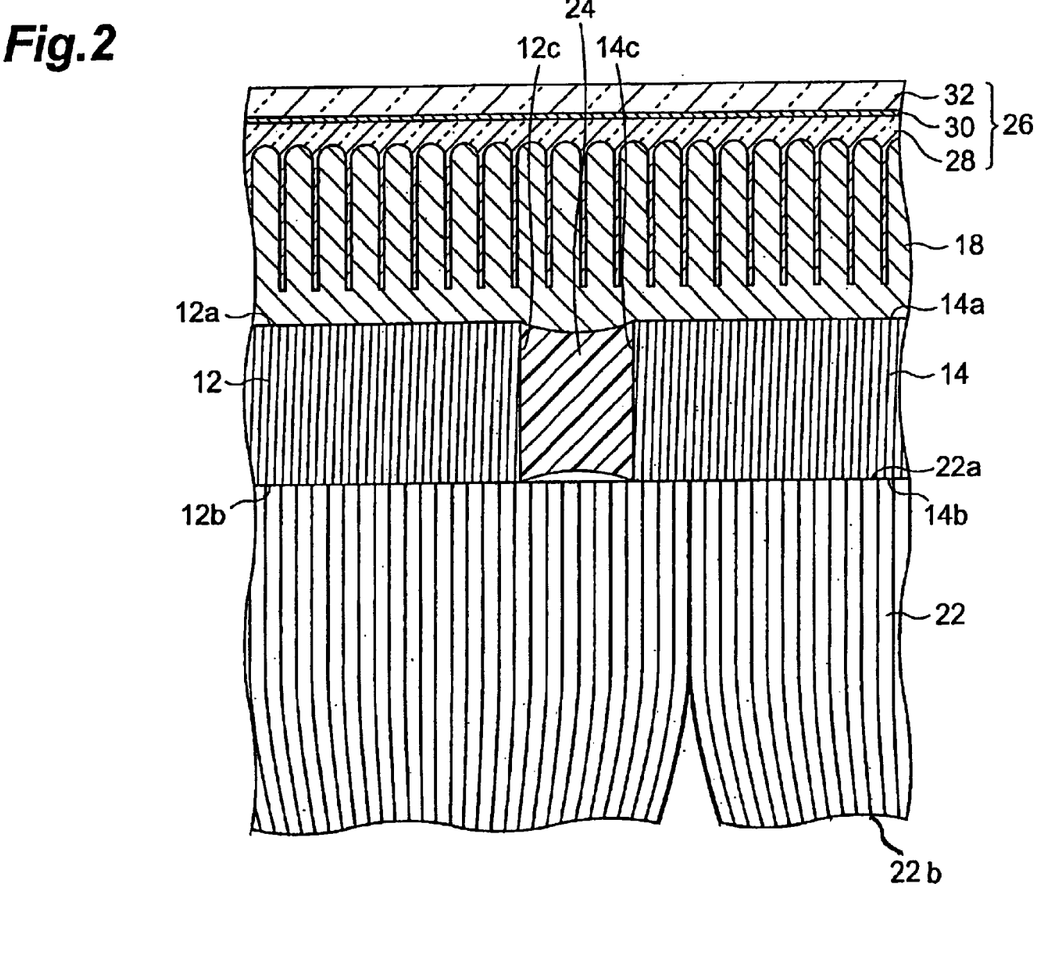
FIG. 2 is a partly enlarged cross-sectional view along a line I—I of FIG. 1.

The structure of the radiation detector according to the present embodiment will be first described. FIG. 1 is a perspective view of the radiation detector according to the present embodiment and FIG. 2 is a partly enlarged cross-sectional view along a line I—I of FIG. 1. The scintillator panel of the present invention is included in the radiation detector according to the present embodiment and an illustration of the scintillator panel separated from the radiation detector of the present embodiment is presented in FIG. 3.

Figure 3:
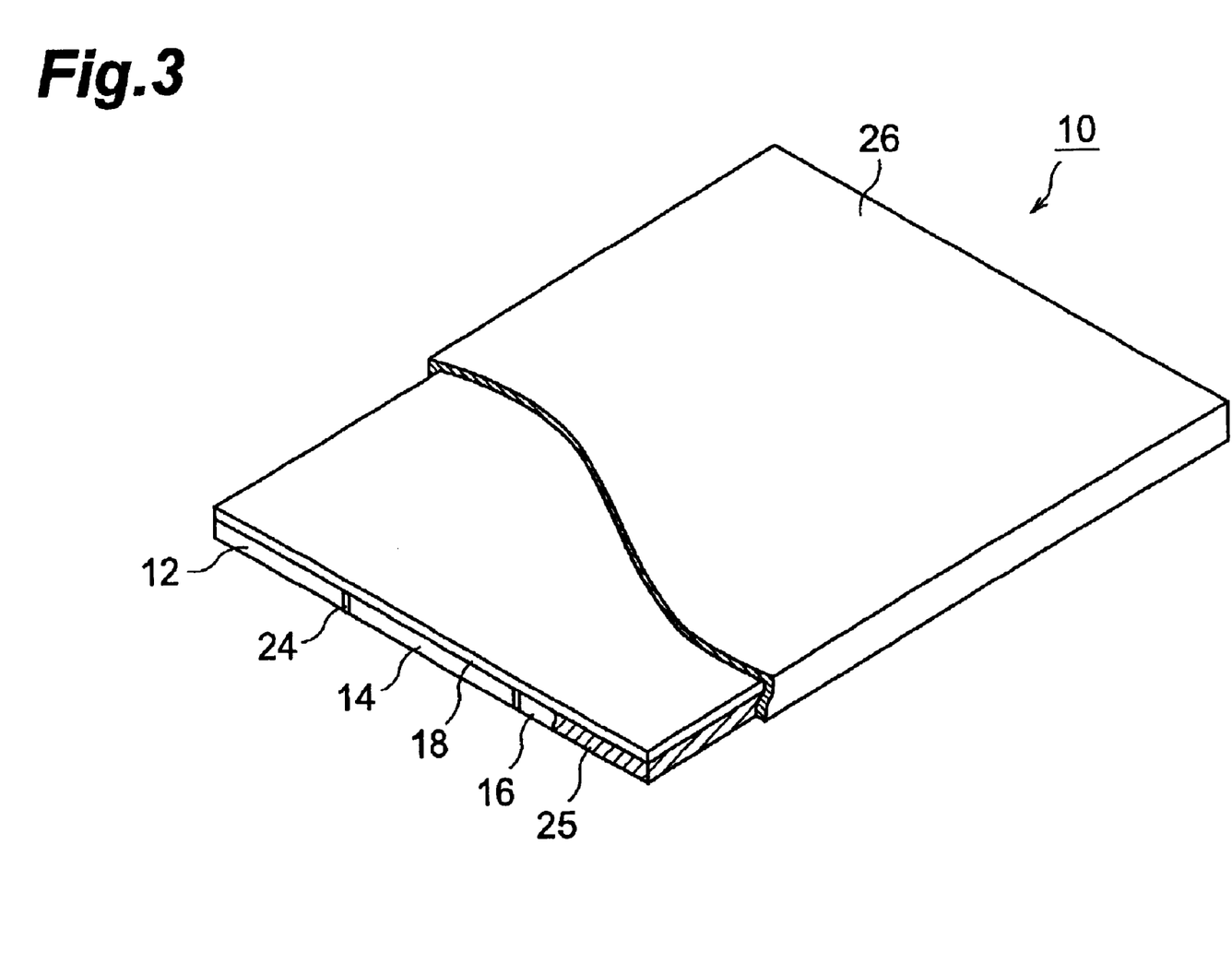
FIG. 3 is a perspective view of a scintillator panel according to the embodiment of the present invention.

The radiation detector 10 of the present embodiment is comprised of three optical members 12, 14, 16 arranged so that their entrance end faces 12a, 14a, 16a are placed on a substantially identical plane; a scintillator 18 grown on the unified surface formed by bonding the entrance end faces 12a, 14a, 16a of the optical members 12, 14, 16; a plurality of CCDs 20 (image pickup devices) for picking up optical images outputted from respective exit end faces 12b, 14b, 16b of the optical members 12, 14, 16; and a plurality of lightguide optical members 22 for guiding the optical images outputted from the respective exit end faces 12b, 14b, 16b of the optical members 12, 14, 16 to the CCDs 20. These will be described below in detail.

Since the optical members 12, 14, 16 have like shape, only the optical member 12 will be described below. The optical member 12 is comprised of integrally formed optical fibers (of the diameter of about 6 μm) arranged in the density of several million fibers/cm² and in parallel to each other and has the entrance end face 12a and exit end face 12b substantially perpendicularly intersecting with the axes of the optical fibers and being substantially parallel to each other. Namely, an optical image entering the entrance end face 12a propagates in each of the above optical fibers making the optical member 12, to be outputted from the exit end face 12b.

The entrance end face 12a and exit end face 12b of the optical member 12 are of a rectangular shape having the short sides of about 63 mm and the long sides of about 270 mm and the spacing between the entrance end face 12a and the exit end face 12b is approximately 4 mm. Accordingly, the optical member 12 is of a flat plate shape having the rectangular bottom surface of approximately 63 mm×270 mm and the thickness of approximately 4 mm.

The three optical members 12, 14, 16 are arranged so that their entrance end faces 12a, 14a, 16a are placed on a substantially identical plane. More specifically, the optical members 12, 14, 16 are arranged so that their longer side faces 12c, 14c, 16c are adjacent to each other.

The mutually adjoining side faces 12c, 14c, 16c of the three optical members 12, 14, 16 are bonded and fixed to each other with an adhesive 24. Here the adhesive 24 is one capable of absorbing light appearing in the scintillator 18 and then entering the adhesive 24, and particularly, it is preferable to use an adhesive capable of absorbing 50% or more of the light appearing in the scintillator 18 and then entering the adhesive 24. An example of the adhesive 24 of this type is EPO-TEK353ND (trade name) available from EPOXY TECHNOLOGY, Inc.

By arranging the three optical members 12, 14, 16 as described above, it becomes feasible to integrate the entrance end faces 12a, 14a, 16a. More specifically, the three optical members 12, 14, 16 are arranged and bonded and then their peripheral surfaces are polished, whereby the entrance end face is made substantially in the large area of approximately 186 mm×248 mm. It is also conceivable to form an optical member having an entrance end face of a large area from the beginning, by integrally forming a number of optical fibers, but control of homogeneity or the like becomes harder with increase in the area of the entrance end face of the integrally formed optical member. Therefore, it is very practical and economical to employ the method of forming the entrance end face of the large area by arranging a plurality of optical members each having its entrance end face of a relatively small area as described above.

Since the adhesive 24 is filled between the mutually adjoining side faces 12c, 14c, 16c of the three optical members 12, 14, 16, the portions filled with the adhesive 24 function as dead spaces incapable of transferring an optical image from the entrance end face side to the exit end face side. It is thus preferable to set spacings between the mutually adjoining side faces 12c, 14c, 16c of the three optical members 12, 14, 16, i.e., widths of the regions filled with the adhesive 24 as small as possible. In the radiation detector 10 of the present embodiment, comparing and carefully considering the widths of the dead spaces made by the filling of the adhesive 24 and the adhesive capability of the adhesive 24, the spacings between the mutually adjoining side faces 12c, 14c, 16c of the three optical members 12, 14, 16, i.e., the widths of the regions filled with the adhesive 24 are set in the range of 10 to 15 μm. A light shield member 25 having the optical transmittance of not more than 50%, broken in part in FIG. 1 (and in FIG. 3), is formed by coating on the mutually nonadjoining side faces 12c, 14c, 16c, i.e., on the side faces exposed to the outside, out of the side faces 12c, 14c, 16c of the three optical members 12, 14, 16.

The scintillator 18 to emit visible light upon incidence of a radiation such as X-rays or the like is formed by vapor phase growth on the unified surface composed of the entrance end faces 12a, 14a, 16a and the bonded portions filled with the adhesive 24. The scintillator 18 is made of CsI with dopant of Tl and formed into an array of prismatic structures extending by about 600 μm in the substantially vertical direction from the entrance end faces 12a, 14a, 16a. A scintillator to emit ultraviolet light with incidence of a radiation or a scintillator made of CsI with dopant of Na, NaI with dopant of Tl, LiI with dopant of Eu or KI with dopant of Tl can be substituted for CsI with dopant of Tl used in the scintillator 18 of this embodiment. In case a scintillator to emit ultraviolet light with incidence of a radiation is formed, the radiation image can be picked up by use of image pickup devices sensitive to the wavelength region of ultraviolet light.

A protective film 26, which physically protects the scintillator 18 and which prevents deliquescence of CsI making the scintillator 18, is formed on the scintillator 18. The protective film 26 is of a three-layer structure in which a first layer 28 (moisture-resistant protective layer), a second layer 30, and a third layer 32 are successively laid on the scintillator 18. Describing in more detail, the protective film 26 is not formed only on the scintillator 18, but is also formed over the side face of the scintillator 18 and over the side faces 12c, 14c, 16c of the optical members 12, 14, 16.

The first layer 28 is made of polyparaxylylene resin and is formed in contact with the scintillator 18. More specifically, the first layer is formed to fill spaces between the prismatic structures of CsI and is further grown by about 10 μm from the tops of the prismatic structures. An example of such polyparaxylylene resin is Parylene (trade name) available from Three Bond Co., Ltd. The polyparaxylylene resin has excellent features suitable for protecting the scintillator 18, e.g., extremely low permeability for water vapor and gas, high water repellency and chemical resistance, excellent electric insulation even in a thin film, and transparency for radiations and visible rays.

The details of coatings of polyparaxylylene are described in Three Bond Technical News issued on Sep. 23, 1992 and its features will be described below.

A coating of polyparaxylylene can be made by chemical vapor deposition (CVD) to effect evaporation thereof on a substrate in vacuum, similar to vacuum evaporation of metal. This method consists of a step of thermally decomposing a di-para-xylylene monomer of a raw material, and quickly cooling products in an organic solvent such as toluene or benzene to obtain di-para-xylylene called a dimer, a step of thermally decomposing this dimer to produce stable radical para-xylylene gas, and a step of adsorbing and polymerizing the generated gas on a substrate to form a polyparaxylylene film with the molecular weight of about a half million by polymerization.

There are two big differences between the polyparaxylylene evaporation and the vacuum evaporation of metal. First, the pressure during the polyparaxylylene evaporation is 0.1 to 0.2 Torr, which is higher than the pressure of 0.001

Torr in the case of the metal vacuum evaporation. Second, the accommodation coefficient of the polyparaxylylene evaporation is two to four orders of magnitude lower than the accommodation coefficient 1 of the metal evaporation. For this reason, the evaporation proceeds so that a monomolecular film first covers the entire surface of a work and then polyparaxylylene is deposited thereon. Accordingly, a thin film can be produced in uniform thickness, even in the thickness of 0.2 μm, without any pinhole and it is thus also feasible to make a coating over an acute angle part, edge part, and a narrow clearance of micrometer order, which was impossible in a liquid state. In addition, the coating operation does not necessitate a thermal treatment or the like and can be performed at temperatures near room temperature. There thus occurs neither mechanical stress nor thermal distortion due to curing and it is also superior in stability of coating. Further, it permits the coating over almost all solid materials.

The second layer 30 is made of Al and in the thickness of about 0.25 μm on the first layer 28. Since Al has the nature of transmitting radiations and reflecting the visible light, it prevents light generated in the scintillator 18 from leaking to the outside and improves the sensitivity of the radiation detector 10. An inorganic matter, such as $SiO_2$ or SiN, having the nature of transmitting radiations and reflecting the visible light can be substituted for Al.

The third layer 32 is also made of the polyparaxylylene resin as the first layer 28 was, and it is formed in the thickness of about 10 μm on the second layer 30. Al making the second layer 30 is easy to corrode in air, but the Al is prevented from corroding, because the second layer 30 is sandwiched between the first layer 28 and the third layer 32 made of the polyparaxylylene resin.

The lightguide optical members 22 are also constructed of integrally formed optical fibers arranged in the density of several million fibers/cm² and in parallel to each other, similar to the optical member 12 and others, and they have their respective entrance end faces 22a and exit end faces 22b intersecting with the axes of the optical fibers. However, the lightguide optical members 22 have such a taper shape that the exit end faces 22b are smaller than the entrance end faces 22a. Accordingly, an optical image incident to the entrance end faces 22a propagates in each of the above optical fibers making the lightguide optical members 22 and is outputted as reduced images from the exit end faces 22b.

The entrance end faces 22a of the respective lightguide optical members 22 are in contact with the exit end faces 12b, 14b, 16b of the optical members 12, 14, 16. It is noted herein that the lightguide optical members 22 do not always have to be provided corresponding to the respective exit end faces 12b, 14b, 16b of the optical members 12, 14, 16 but they may be provided for respective areas obtained by arbitrarily dividing the integrated area of the exit end faces 12b, 14b, 16b in the arrangement of the three optical members 12, 14, 16. In the radiation detector 10 of the present embodiment, the integrated area of the exit end faces 12b, 14b, 16b in the arrangement of the three optical members 12, 14, 16 is divided into totally twelve areas, three vertical and four horizontal, and the lightguide optical members 22 are arranged one per area. Therefore, there are provided the twelve lightguide optical members 22 in total.

The CCDs 20 are connected to the corresponding exit end faces 22b of the lightguide optical members 22. Therefore, the radiation detector 10 of the present embodiment is provided with the twelve CCDs 20.

Figure 4A:
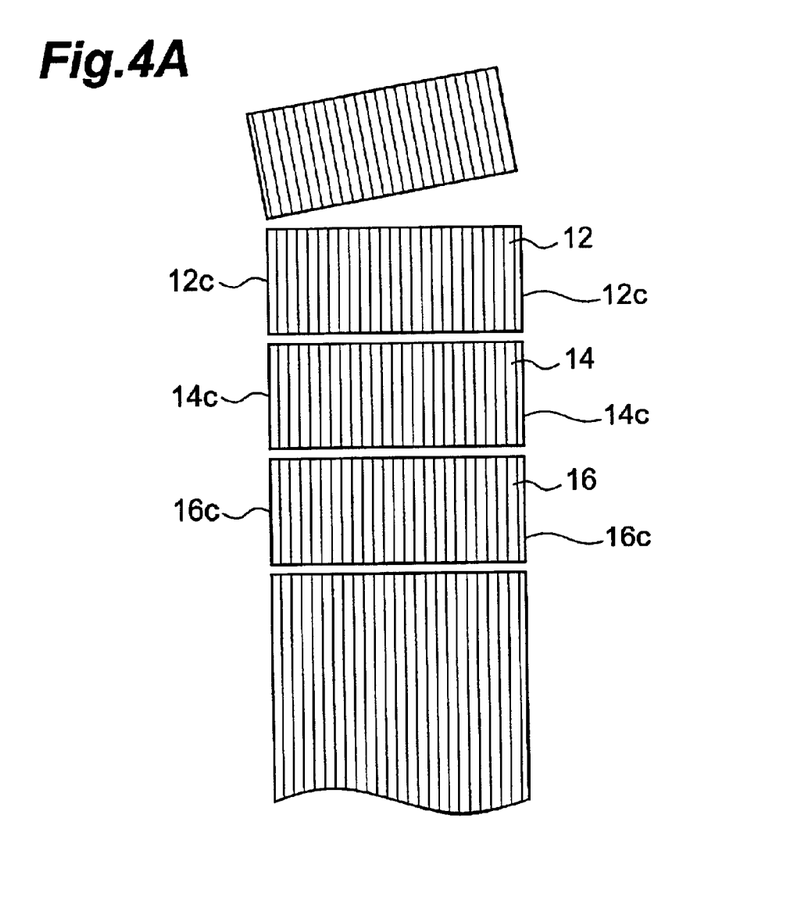
FIGS. 4A to 4F are views showing manufacturing steps of the scintillator panel according to the embodiment of the present invention.

A method of making a radiation detector in accordance with an embodiment of the present invention will now be explained. FIGS. 4A to 4F are views showing manufacturing steps of the radiation detector 10 in accordance with this embodiment. Initially, for making the radiation detector 10, an optical member is processed such that the entrance and exit end faces are parallel to each other and each optical member has same thickness. As shown in FIG. 4A, an optical fiber block formed by integrating a plurality of optical fibers arranged in substantially parallel to each other is sliced transversely at uniform interval, whereby the optical members 12, 14, 16 are formed. Thereafter, each of the side faces 12c, 14c, 16c of optical members 12, 14, 16 is polished with an abrasive having an average particle size of 9.5 μm.

Figure 4B:
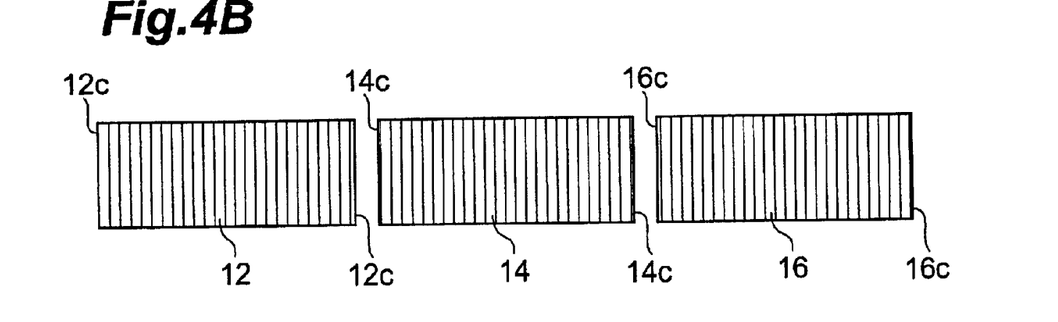

The optical members 12, 14, 16 are arranged such that the entrance end faces thereof are disposed on substantially the same plane, as shown in FIG. 4B. Thereafter, each of the side faces 12c, 14c, 16c of optical members 12, 14, 16 is totally ground against a side face of the adjoining optical member. The optical members 12, 14, 16 are entirely washed with running water, and then the remaining moisture is blown away with an airgun. Thereafter, they are baked at a temperature of 500° C. for about 1 hour, so as to eliminate the organic matters attached to the surface.

Figure 4C:
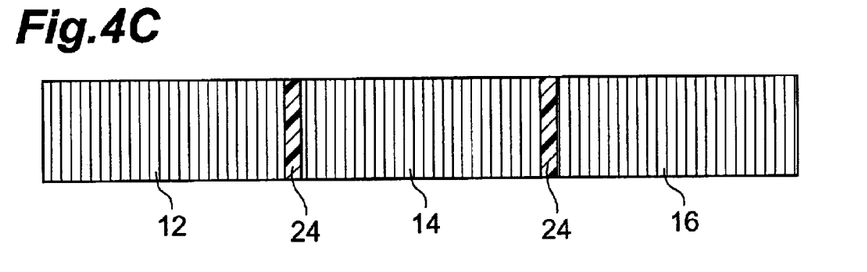

Subsequently, as shown in FIG. 4C, mutually adjoining side faces 12c, 14c, 16c of optical members 12, 14, 16 are bonded to each other with the adhesive 24. Specifically, it is carried out as follows. Namely, mutually adjoining side faces of the optical members 12, 14, 16 are plastered with the adhesive 24 to absorb 50% or more of light entering into it. The optical members 12, 14, 16 are arranged on a bonding pedestal such that the side faces plastered with the adhesive 24 oppose each other and each of the integrated entrance end face and exit end face is placed on substantially the same plane. Thereafter, a pressure is laterally applied to the optical members 12, 14, 16 arranged so as to gradually narrow the gap between the optical members 12, 14, 16. Here, the adhesive 24 is uniformly spread, so as to leave no bubbles in the adhesive 24. Thereafter, a weight is placed on the optical members 12, 14, 16 arranged opposing, so as to initially cure the adhesive (4 hours at 40° C. and 1.5 hours at 80° C.). After the initial curing, the width of bonded portion, whether there is chipping-off or not, and so forth are verified. In this embodiment the width of the spacing between the optical member is narrowed within 20 μm. If the width of bonded portion is appropriate and there is no chipping-off, then the adhesive 24 is finally cured (1 hour at 250° C.)

Figure 4D:
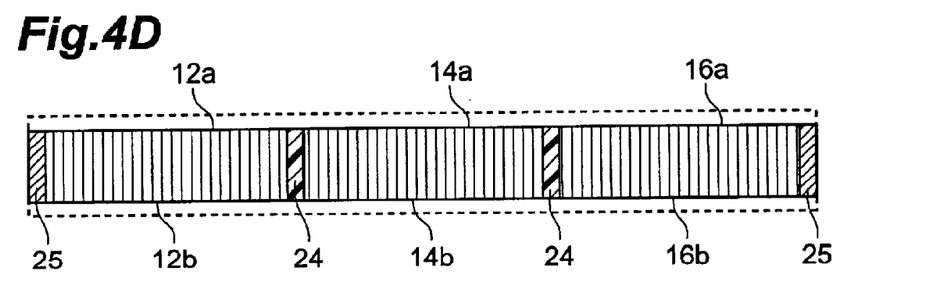

Subsequently, a light shield member 25 having an optical transmittance of not more than 50% is formed around the bonded optical members 12, 14, 16, namely on the mutually nonadjoining side faces 12c, 14c, 16c. Thereafter, as shown in FIG. 4D, the each of unified surfaces on entrance and exit end face sides of the bonded optical members 12, 14, 16, including the light shield member portion, are polished. A light shield member 25 can be formed at other stage, for example, after polishing the unified surface or after a scintillator is formed on the unified surface.

Figure 4E:
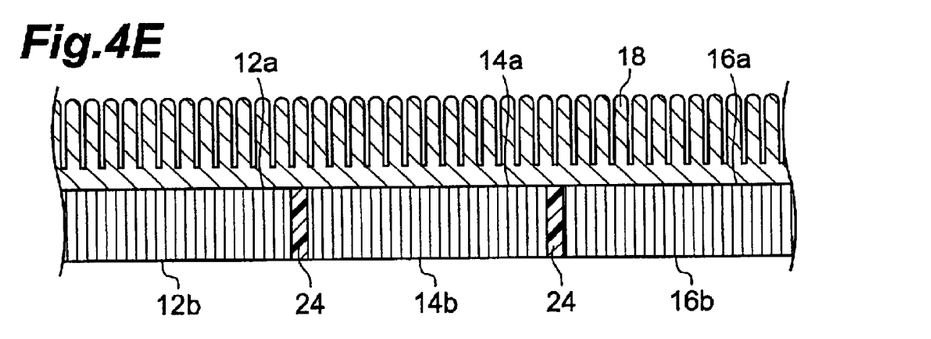

Subsequently, as shown in FIG. 4E, the scintillator 18 is deposited on the unified surface composed of the entrance end faces 12a, 14a, 16a and the bonded portions (the adhesive parts) by vapor-phase growth in such way as the scintillator 18 is comprised of an array of prismatic structures grown in prismatic shape. In this embodiment the scintillator 18 is a scintillator comprised of CsI with dopant of Tl to emit the visible light with incidence of X-rays. But a scintillator to emit ultraviolet light with incidence of X-rays or a scintillator made of CsI with dopant of Na, NaI with dopant of Ti, LiI with dopant of Eu or KI with dopant of Tl can be substituted for CsI with dopant of Ti used in the the scintillator 18 of this embodiment.

Figure 4F:
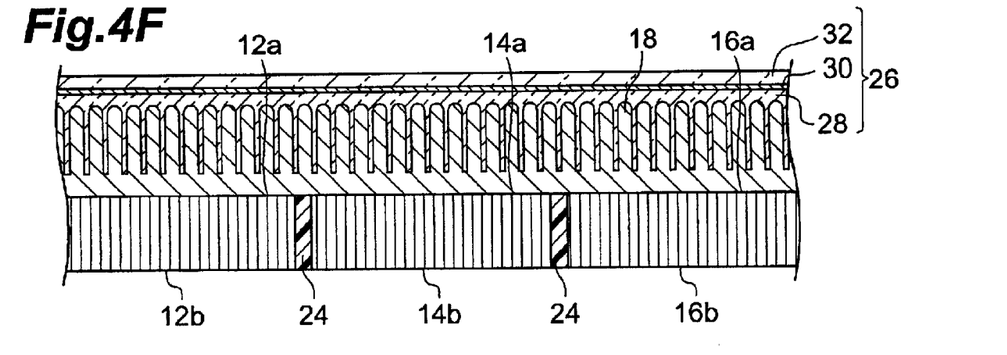

Subsequently, as shown in FIG. 4F, the protective film 26 is formed thereon. Specifically, a first layer 28 (moisture-resistant protective layer) of polyparaxylylene is formed on the scintillator 18 by vapor phase growth, filling spaces between the prismatic structures of CsI. Also, a second layer 30 made of AL and a third layer 32 made of polyparaxylylene are successively laid on the first layer 28 by vapor phase growth. In this embodiment the first layer 28 (moisture-resistant protective layer) is made of polyparaxylylene, but a moisture-resistant protective layer made of polyparachloroxylylene can be substituted. And an inorganic matter other than Al, such as $SiO_2$ or SiN, having the nature of transmitting radiations and reflecting the visible light can be substituted as a material of a second layer.

The lightguide optical members 22 and CCDs 20 are connected to the optical members 12, 14, 16 on the exit end face 12b, 14b, 16b side, whereby the radiation detector 10 is accomplished.

In the next place, the action and effect of the radiation detector of the present embodiment will be described below. With incidence of a radiation image into the scintillator 18, an image of visible light (hereinafter referred to as an optical image) corresponding to the incident radiation image is generated inside the scintillator 18 because of the radiation-visible light conversion action of CsI.

The optical image generated inside the scintillator 18 enters the optical members 12, 14, 16 through the entrance end faces 12a, 14a, 16a thereof and propagates inside the optical members 12, 14, 16 to emerge from the exit end faces 12b, 14b, 16b thereof.

The optical image emerging from the exit end faces 12b, 14b, 16b of the optical members 12, 14, 16 is divided into a plurality of segments (twelve segments in the present embodiment) to enter the entrance end faces 22a of the lightguide optical members 22 placed at the respectively corresponding positions.

After entering the entrance end faces 22a of the lightguide optical members 22, the optical image segments each are reduced by the action of the lightguide optical members 22, are emitted from the exit end faces 22b of the lightguide optical members 22, and are picked up by the respective CCDs 20 connected to the corresponding exit end faces 22b of the lightguide optical members 22. After that, the images picked up by the respective CCDs 20 are relocated by image processing or the like whereby a photographic image can be obtained from the incident radiation image.

Here the radiation detector 10 of the present embodiment is constructed so that the three optical members 12, 14, 16 are arranged with their entrance end faces 12a, 14a, 16a being placed on the substantially identical plane and their adjoining side faces 12c, 14c, 16c are bonded and fixed with the adhesive 24 to integrate the entrance end faces 12a, 14a, 16a readily, thereby making it feasible to obtain the photoreceptive surface of the large area. As a result, it becomes feasible to pick up the radiation image over an extremely wide range.

In the radiation detector 10 of the present embodiment the scintillator 18 is grown on the integrated surface of the arranged entrance and faces 12a, 14a, 16a, contrary to the way in which separate scintillators are formed on the respective optical members and such optical members are arrayed thereafter. Therefore, it becomes possible to control to the minimum occurrence of dead spaces at the edges of the optical members due to nonuniformity of growth of CsI making the scintillator or the like. In case separate scintillators are formed on the respective optical members and they are arrayed thereafter, there are the above dead spaces at the edges of the respective optical members. In the array of such optical members, therefore, there appear dead spaces in a grating pattern on the photoreceptive surface. In contrast with it, when the scintillator 18 is grown on the entrance end faces 12a, 14a, 16a integrated by the arrangement, as in the case of the radiation detector 10 of the present embodiment, the dead spaces are made only at the outermost edges of the integrated photoreceptive surface and there appear no such dead spaces in the grating pattern. As a result, it becomes feasible to reduce the dead spaces to the extremely small area.

In the radiation detector 10 of the present embodiment, the adhesive 24 has the property of absorbing the light generated in the scintillator 18 upon incidence of a radiation and then entering the adhesive 24, particularly, the property of absorbing 50% or more of the light generated in the scintillator 18 upon incidence of a radiation and then entering the adhesive 24. The optical fibers making the optical members 12, 14, 16 are usually arranged nearly perpendicular to their entrance end faces 12a, 14a, 16a, but they are not always perfectly perpendicular. There are cases wherein the cores of the optical fibers are exposed in the side faces 12c, 14c, 16c, and light can leak from the side faces 12c, 14c, 16c in certain cases. Such leaking light becomes noise against the photographic image and thus is the cause of lowering S/N ratios of the radiation detector. In the radiation detector 10 of the present embodiment, the adhesive 24 absorbs the leaking light from the side faces 12c, 14c, 16c of the optical members 12, 14, 16, thereby increasing the S/N ratios. Since such an adhesive 24 usually has color, it facilitates visual inspection of defectives during production.

In the radiation detector 10 of the present embodiment, the spacings between the mutually adjoining optical members 12, 14, 16 are set in the range of 10 to 15 $\mu$m. The clearances between the mutually adjoining optical members 12, 14, 16, filled with the adhesive 24, function as dead spaces incapable of transferring the optical image from the entrance end face side to the exit end face side. The adhesive 24 filled in the clearances between the mutually adjoining optical members 12, 14, 16 often becomes concave with respect to the entrance end faces 12a, 14a, 16a of the optical members 12, 14, 16. The occurrence of this concave shape can sometimes cause failure in uniform deposition of the scintillator 18 or peeling of the scintillator 18 because of mixture of impurities in the concave portions. Further, since the depth of the concave portions increases, the peeling becomes easier to occur with increase in the spacings of the adhesive 24. Therefore, it is preferable to set the spacings between the mutually adjoining optical members 12, 14, 16 as small as possible.

Table 1 presents rates of samples without peeling of the scintillator 18, i.e., non-defective percentages with variations in the spacings between the optical members 12, 14, 16 (which are referred to simply as spacings in the table).

TABLE 1

| Spacings | Number of samples | Number of non-defectives | Non-defective percentage |
| --- | --- | --- | --- |
| over 80 $\mu$m | 3 | 0 | 0% |
| 70–80 $\mu$m | 5 | 1 | 20% |

TABLE 1-continued

| Spacings | Number of samples | Number of non-defectives | Non-defective percentage |
|---|---|---|---|
| 60–70 µm | 6 | 2 | 33% |
| 50–60 µm | 8 | 4 | 50% |
| 40–50 µm | 9 | 6 | 67% |
| 30–40 µm | 10 | 8 | 80% |
| 20–30 µm | 10 | 9 | 90% |
| 20 µm and less | 20 | 20 | 100% |

As seen from Table 1, the non-defective percentage of not less than 67% can be attained when the spacings between the optical members 12, 14, 16 are not more than 50 µm. Further, when the spacings are not more than 20 µm, the non-defective percentage of almost 100% can be attained.

In the radiation detector 10 of the present embodiment, the spacings between the optical members 12, 14, 16 are set in the range of 10 to 15 µm. Accordingly, the widths of the dead spaces caused between the mutually adjoining optical members 12, 14, 16 are extremely small, 20 to 30 µm, and the peeling of the scintillator 18 can be prevented.

The radiation detector 10 of the present embodiment is provided with the protective film 26 consisting of the stack of the first layer 28 of the polyparaxylylene resin, the second layer 30 of Al, and the third layer of the polyparaxylylene resin, on the scintillator 18. Here the first layer 28 of the polyparaxylylene resin prevents deliquescence of CsI making the scintillator 18 by protecting it from water vapor and the like, and maintains the radiation-light conversion characteristics of the scintillator 18 in a good level. The second layer 30 of Al confines the light generated in the scintillator 18 upon incidence of a radiation to improve the detection sensitivity of the radiation detector 10. The third layer 32 of the polyparaxylylene resin prevents the corrosion of Al making the second layer 30 by keeping it from water vapor and the like.

In the radiation detector 10 of the above embodiment the first layer 28 and the third layer 32 making the protective film 26 were made of the polyparaxylylene resin, but they can also be made of polyparachloroxylylene resin. When the first layer 28 and the third layer 32 are made of the polyparachloroxylylene resin, they can also effectively prevent the deliquescence of CsI and the corrosion of Al. An example of such polyparachloroxylylene resin is Parylene C (trade name) available from Three Bond Co., Ltd.

In the radiation detector 10 of the above embodiment the protective film 26 is composed of three-layer, in which the first layer 28, the second layer 30 and the third layer 32 are successively formed. But the second layer 30 and the third layer 32 are not essential. A protective film composed of single layer of the polyparaxylylene resin or polyparachloroxylylene resin can prevent deliquescence of CsI, physically protecting the scintillator 18.

With provision of the CCDs 20, the radiation detector of the present embodiment becomes able to effectively pick up the radiation image entering the scintillator 18. Further, with provision of the lightguide optical members 22, the optical image emerging from the exit end faces 12b, 14b, 16b of the optical members 12, 14, 16 can be efficiently guided to the CCDs 20.

Figure 5:
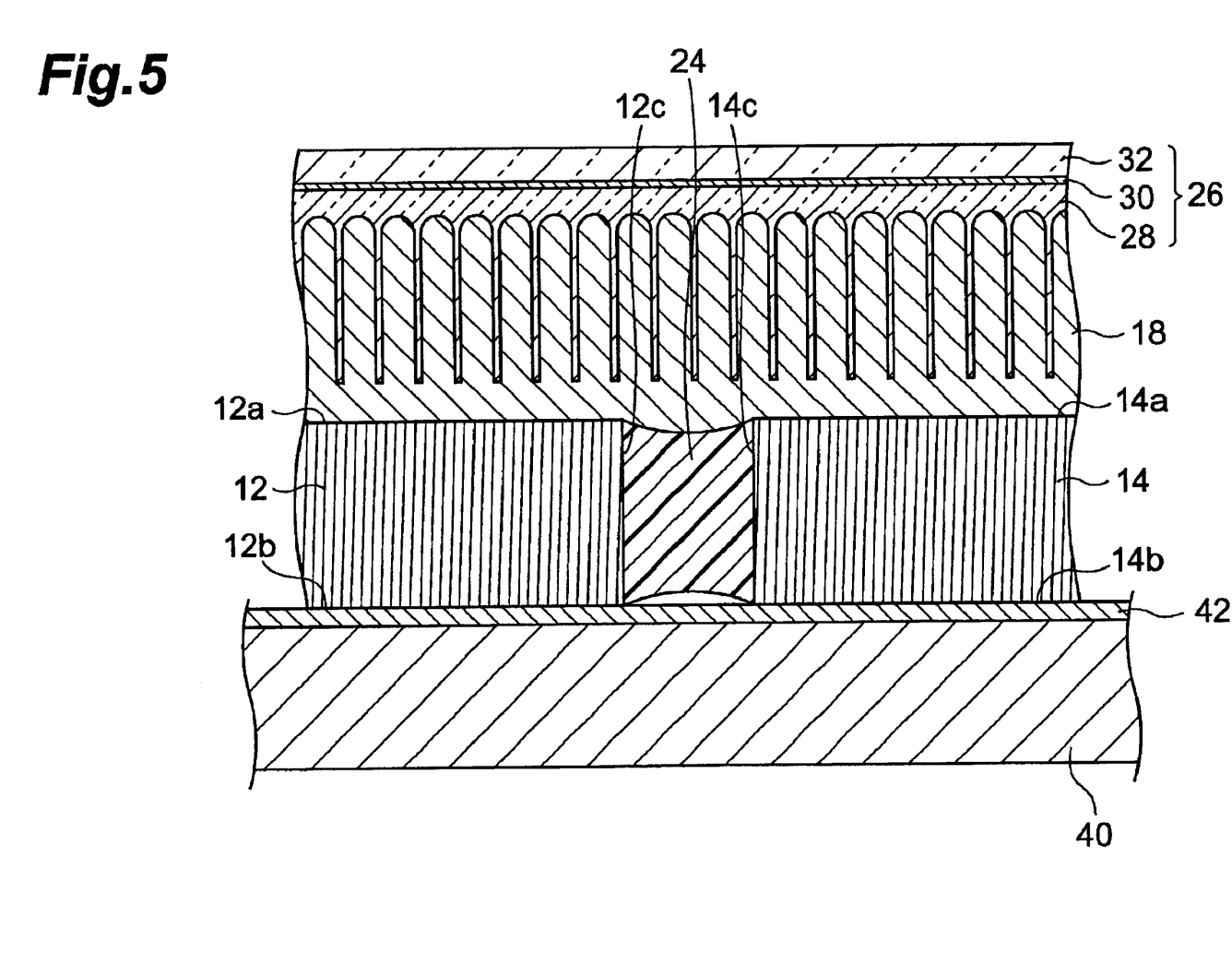
FIG. 5 is a partly cross-sectional view of the radiation detector in which an image pickup device is installed directly in contact with the exit end faces of optical members.

The radiation detector 10 of the above embodiment is provided with the lightguide optical members 22 for guiding to an image pickup device (CCDs 20) the optical image emerging from the exit end faces 12b, 14b, 16b of the optical members 12, 14, 16, but the image pickup device can also be installed directly in contact with the exit end faces 12b, 14b, 16b. FIG. 5 shows the partly cross-sectional view of the radiation detector in which an image pickup device 40 is installed directly in contact with the exit end faces 12b, 14b, 16b. The image pickup device 40 comprises an image pickup surface 42 from which optical image enters into the image pickup device 40. The image pickup surface 42 is attached to the integrated surface of exit end faces 12b, 14b, 16b. In this embodiment the image pickup device 40 can pick up the optical image outputted from the exit end faces 12b, 14b, 16b directly. An image sensor constructed by combining amorphous silicon photo diode and thin film transistor (TFT), MOS (Metal Oxide Semiconductor) type image sensor or other devices can be applied as an image pickup device.

What is claimed is:

1. A scintillator panel comprising a plurality of optical members having a flat plate shape, each optical member comprising a plurality of integrally formed optical fibers arranged substantially parallel to each other and each optical member having an entrance end face and an exit end face substantially parallel to each other, wherein said optical members are arranged so that said entrance end faces are positioned in a substantially identical plane, wherein mutually adjoining side faces of said optical members are bonded to each other with an adhesive, wherein a scintillator to emit light upon incidence of radiation is deposited on a unified surface composed of said entrance end faces integrated by bonding said side faces and adhesive parts formed in spacing regions between said optical members adjacent to each other.

2. A scintillator panel according to claim 1, wherein said scintillator is grown by vapor phase growth.

3. A scintillator panel according to claim 2, wherein said scintillator is comprised of an array of prismatic structures grown in a prismatic shape.

4. A scintillator panel according to claim 1, wherein said scintillator is a scintillator to emit visible light with incidence of an X-ray.

5. A scintillator panel according to claim 4, wherein said scintillator comprises CsI.

6. A scintillator panel according to claim 1, wherein said scintillator is a scintillator to emit ultraviolet light with incidence of an X-ray.

7. A scintillator panel according to claim 1, wherein said adhesive is an adhesive to absorb light generated in said scintillator upon incidence of a radiation and then entering the adhesive.

8. A scintillator panel according to claim 7, wherein said adhesive is an adhesive to absorb 50% or more of the light generated in said scintillator upon incidence of the radiation and then entering the adhesive.

9. A scintillator panel according to claim 1, wherein a light shield member is formed on mutually nonadjoining side faces of said optical members.

10. A scintillator panel according to claim 9, wherein said light shield member is a light shield member having an optical transmittance of not more than 50%.

11. A scintillator panel according to claim 1, wherein the spacing between said optical members adjacent to each other is not more than 50 µm.

12. A scintillator panel according to claim 1, wherein the spacing between said optical members adjacent to each other is not more than 20 µm.

13. A scintillator panel according to claim 1, wherein a protective film is formed on said scintillator.

14. A scintillator panel according to claim 13, wherein said protective film comprises a moisture-resistant protective layer of polyparaxylylene formed in contact with said scintillator.

15. A scintillator panel according to claim 13, wherein said protective film comprises a moisture-resistant protective layer of polyparachloroxylylene formed in contact with said scintillator.

16. A radiation detector comprising the scintillator panel as set forth in claim 1, and an image pickup device for picking up an optical image outputted from said exit end faces of said optical members.

17. A radiation detector according to claim 16, further comprising a lightguide optical member for guiding the optical image outputted from said exit end faces of said optical members, to said image pickup device.

18. A method of making a scintillator panel; said method comprising:

an arranging step of arranging a plurality of optical members, each having entrance and exit end faces substantially parallel to each other and being composed of a plurality of optical fibers arranged substantially parallel to each other, such that said entrance end faces are disposed in substantially the same plane;

a bonding step of bonding with an adhesive said optical members adjacent to each other; and a depositing step of depositing a scintillator on a unified surface composed of said entrance end faces integrated by bonding said optical members adjacent to each other and adhesive parts formed in spacing regions between said optical members adjacent to each other.

19. A method of making a scintillator panel according to claim 18, wherein said scintillator is formed by vapor phase growth.

20. A method of making a scintillator panel according to claim 19, wherein said scintillator is comprised of an array of prismatic structures grown in a prismatic shape.

21. A method of making a scintillator panel according to claim 18, wherein said scintillator is a scintillator to emit visible light with incidence of an x-ray.

22. A method of making a scintillator panel according to claim 21, wherein said scintillator comprises CsI.

23. A method of making a scintillator panel according to claim 18, wherein said scintillator is a scintillator to emit ultraviolet light with incidence of an x-ray.

24. A method of making a scintillator panel according to claim 18, wherein said adhesive is an adhesive to absorb light generated in said scintillator upon incidence of a radiation and then entering the adhesive.

25. A method of making a scintillator panel according to claim 24, wherein said adhesive is an adhesive to absorb 50% or more of light generated in said scintillator upon incidence of a radiation and then entering the adhesive.

26. A method of making a scintillator panel according to claim 18, further comprising a forming step of forming a light shield member on the mutually nonadjoining side faces of said optical members.

27. A method of making a scintillator panel according to claim 26, wherein said light shield member is a light shield member having an optical transmittance of not more than 50%.

28. A method of making a scintillator panel according to claim 18, wherein the spacing between said optical members adjacent to each other is not more than 50 $\mu$m.

29. A method of making a scintillator panel according to claim 18, wherein the spacing between said optical members adjacent to each other is not more than 20 $\mu$m.

30. A method of making a scintillator panel according to claim 18, further comprising a forming step of forming a protective film on said scintillator.

31. A method of making a scintillator panel according to claim 30, wherein said protective film comprises a moisture-resistant protective layer of polyparaxylylene formed in contact with said scintillator.

32. A method of making a scintillator panel according to claim 30, wherein said protective film comprises a moisture-resistant protective layer of polyparachloroxylylene formed in contact with said scintillator.

* * * * *